(12) United States Patent
Scherlen (10) Patent No.: US 9,727,946 B2
(45) Date of Patent: Aug. 8, 2017

(54) METHOD OF CUSTOMIZING AN ELECTRONIC IMAGE DISPLAY DEVICE

(71) Applicant: ESSILOR INTERNATIONAL (COMPAGNIE GENERALE D'OPTIQUE), Charenton le Pont (FR)

(72) Inventor: Anne-Catherine Scherlen, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 0 days.

(21) Appl. No.: 14/785,741

(22) PCT Filed: Mar. 25, 2014

(86) PCT No.: PCT/FR2014/050694
§ 371 (c)(1),
(2) Date: Oct. 20, 2015

(87) PCT Pub. No.: WO2014/174168
PCT Pub. Date: Oct. 30, 2014

(65) Prior Publication Data
US 2016/0078594 A1    Mar. 17, 2016

(30) Foreign Application Priority Data
Apr. 25, 2013 (FR) ...................... 13 53786

(51) Int. Cl.
*G09G 5/00* (2006.01)
*H04L 29/08* (2006.01)
(Continued)

(52) U.S. Cl.
CPC .......... *G06T 3/40* (2013.01); *G06F 17/30345* (2013.01); *G09G 5/00* (2013.01);
(Continued)

(58) Field of Classification Search
CPC ....... G06T 3/40; G06F 17/30345; G09G 5/00; G09G 2320/0626; G09G 2320/066;
(Continued)

(56) References Cited

U.S. PATENT DOCUMENTS 6,033,073 A * 3/2000 Potapova ........... A61B 5/04842
351/211
8,494,507 B1 * 7/2013 Tedesco .................... A61F 4/00
434/112
(Continued)

FOREIGN PATENT DOCUMENTS

EP    1 960 821        8/2008
EP    2 070 338 B1     9/2012
(Continued)

OTHER PUBLICATIONS

International Search Report, dated Jul. 10, 2014, from corresponding PCT application.
(Continued)

*Primary Examiner* — Jacinta M Crawford
*Assistant Examiner* — Phuc Doan
(74) *Attorney, Agent, or Firm* — Young & Thompson (57) ABSTRACT

A method for customizing an electronic image display device having at least one display parameter of variable value includes: a) linking the electronic image display device to a user database, determining and recording at least one value of an evaluation parameter for the visual and oculomotor profile of a user; b) linking the electronic image display device to a display database and making a digital record including a plurality of values for the display parameter which are associated with an electronic image display device; c) selecting an optimum value for the display parameter from among the plurality of display parameters values in the digital record that are associated with the (Continued)

electronic image display device in the display database according to the visual acuity measurement associated with this user in the user database; d) automatically applying the optimum value for this image display parameter to the electronic image display device.

17 Claims, 3 Drawing Sheets

(51) Int. Cl.
*G06T 3/40* (2006.01)
*G06F 17/30* (2006.01)
*H04N 13/04* (2006.01)

(52) U.S. Cl.
CPC ......... *H04L 67/30* (2013.01); *H04N 13/0429* (2013.01); *G09G 2320/066* (2013.01); *G09G 2320/0626* (2013.01); *G09G 2320/08* (2013.01); *G09G 2380/08* (2013.01)

(58) Field of Classification Search
CPC  G09G 2320/08; G09G 2380/08; H04L 67/30; H04N 13/0429
See application file for complete search history.

(56) References Cited

U.S. PATENT DOCUMENTS

| | | |
|---|---|---|
| 2007/0159470 A1 | 7/2007 | Jeng et al. |
| 2009/0089718 A1 | 4/2009 | Pompilio et al. |
| 2009/0146916 A1 | 6/2009 | Moliton |
| 2011/0102558 A1* | 5/2011 | Moliton ............. H04N 13/0022 348/54 |
| 2011/0157180 A1* | 6/2011 | Burger ...................... G06T 3/00 345/428 |
| 2012/0250039 A1 | 10/2012 | Ollivierre et al. |
| 2012/0254779 A1 | 10/2012 | Ollivierre et al. |
| 2016/0007849 A1* | 1/2016 | Krueger ................. A61B 3/113 600/301 |
| 2016/0262608 A1* | 9/2016 | Krueger ............... A61B 3/0041 |

FOREIGN PATENT DOCUMENTS

| | | |
|---|---|---|
| FR | 2 882 849 A1 | 9/2006 |
| WO | 2011/156721 A1 | 12/2011 |

OTHER PUBLICATIONS

Chinese Office Action issued in Application No. 201480022854.8, dated Aug. 11, 2016, with English Translation.

* cited by examiner

METHOD OF CUSTOMIZING AN ELECTRONIC IMAGE DISPLAY DEVICE

TECHNICAL FIELD OF THE INVENTION

The present invention generally relates to the field of image-displaying electronic devices having a display screen, such as a computer, a television, a smart phone, a tablet computer, an e-reader or even a video magnifier or electronic magnifying glass. The invention also relates to image-displaying electronic devices devoid of display screens, such as a piece of informative eyewear that allows one or two virtual images to be displayed in the direction of the eyes of the wearer of this piece of informative eyewear in order to allow images to be viewed via monocular or stereoscopic vision.

These image-displaying electronic devices are used to display a digital document in the form of an image or a digitized text, a video or an Internet page.

These image-displaying electronic devices generally comprise means for adjusting display parameters (or configuration parameters) allowing for example the image of the displayed digital document to be enlarged and the contrast or brightness of the display to be increased.

The invention more particularly relates to the personalization and adaptation of display parameters of an electronic appliance for displaying images, especially depending on the visual capacities of the user, on the use conditions and/or depending on the content of the image that the user would like to view.

PRIOR ART

Electronic devices with digital screens are continuously being developed: smart phones, tablet computers, computers and video projectors are increasingly ubiquitous in advanced societies.

Generally, the expression "image-displaying electronic device" is understood to mean any optoelectronic device suitable for displaying or projecting a real or virtual image intended to be viewed by a user.

The various types of image-displaying electronic device have different use conditions, especially in terms of:
- different distances of use between the user and the screen depending on the type of screen, for example for a television set and a tablet computer;
- static or dynamic use conditions for a smart phone; and
- variable ambient brightness conditions for a piece of informative eyewear or other systems (tablets, telephones, etc.).

These various use conditions lead to different visual performances for a given user.

In addition, varying types of visual activities may be associated with an image-displaying electronic device: reading of a digitized text, viewing of a fixed image, of a video or of a film. Depending on the way in which an image-displaying electronic device is used and depending on the type of activity, use of an image-displaying electronic device may be the origin of visual fatigue or headaches.

These complaints may affect both healthy young or old users and users affected by a pathology leading to a visual deficiency, such as a drop in visual acuity or perception of contrasts, or a neurological pathology leading to difficulties concentrating or moving the eyes.

Thus, a visually deficient person suffers from a loss of visual acuity, from a loss of sensitivity to contrasts and finds it difficult to move their eyes to read a text or recognize an image. In order to allow him to recognize and comprehend an image or a displayed text, it is necessary to process the image or text, or even use visual aids to adapt the content of the image or text to the visual performances of this person.

Frequently used visual aids may consist in enlarging the size of the image in order to compensate for a loss of visual acuity or in displaying a white text on a black background in order to increase contrast or even in placing the content of the displayed image on only part of the screen (on one line for example) in such a way as to decrease as much as possible the ocular movements associated with text exploration strategies.

Such processing of images and/or text is possible with appliances suitable for digitizing a (text, image) medium and displaying a digitized image on a display screen.

For example, video magnifiers (also referred to as closed-circuit TVs (CCTVs)) or electronic magnifying glasses offer to a user image-enhancing functions comprising the adjustment of magnification, contrast, etc. in order to adapt as best as possible the image to the user.

However, it is up to the user to choose and adapt the parameters of the display by adjusting various image control buttons until the user achieves an optimal visual comfort. This adjustment may be complex because the user may find it difficult to perceive and manipulate real buttons, for example taking the form of push-buttons on the edges of the screen, or virtual buttons, in the case of a touchscreen for example.

In addition, it takes time to adjust all of the parameters, for example the magnification, contrast, brightness, the color of the displayed text, the color of the background, etc. depending on the preferences of the user.

Furthermore, these adjustments must generally be re-adapted for each new document medium digitized to form text or images: the size of the text of the source of the displayed image and/or the luminance of the paper may change, thus requiring a different set of parameters.

Means for recording various sets of parameters in a given image-displaying electronic appliance do exist.

In particular a video magnifier from Optelec is known that proposes screen parameterization by barcode. The user himself defines image parameterization values for a given use condition, then himself records this configuration by attributing a barcode thereto. The user may thus store a plurality of configurations corresponding for example to various types of text media for reading on the screen or to an image medium for viewing films, respectively.

For example, the user defines a first configuration associated with an image magnification value for reading a text printed on the screen and another configuration associated with an image size for watching a film on the same screen. The user thus manually configures a plurality of sets of parameters that are recorded in barcode form. The user then activates the preprogrammed image processing mechanism by selecting the appropriate barcode.

However, the user must memorize the various functions associated with each barcode and this may represent an additional difficulty for certain elderly users for example.

There is a need to automatically adapt the values of the display parameters of an image on a screen depending on the visual performances of a user, on the use conditions and/or on the image medium: text, static image, dynamic image, etc.

In addition, a given user must carry out a new parameterization of each new image-displaying electronic device that he would like to use.

There is a need to easily adapt the parameters of various image-displaying electronic devices depending on the visual performances of a given user and on the use conditions of each device without repeating the same fastidious tests.

SUBJECT OF THE INVENTION

In order to remedy the aforementioned drawback of the prior art, the present invention proposes a method for personalizing an image-displaying electronic device having at least one display parameter of variable value, the device being suitable for displaying an image and for modifying the displayed image depending on the value of the display parameter.

More particularly, according to the invention a method is proposed that is configured to allow the value of the display parameter to be adapted to a user by way of the following steps:

a) connecting the image-displaying electronic device to a user database, determining and recording in the user database at least one value of a parameter of evaluation of the visual and oculomotor profile of the user, said at least one value comprising a measurement of the visual acuity of this user;

b) connecting the image-displaying electronic device to a display database and creating, in the display database, a digital record comprising a plurality of display parameter values associated with an image-displaying electronic device and with an identifier of this image-displaying electronic device, the digital record being stored in a register of the display database comprising a plurality of digital records associated with a plurality of image-displaying electronic devices, each record of one image-displaying electronic device of the register being associated with a single identifier;

c) selecting, with regard to viewing by the user of an image displayed by the image-displaying electronic device, an optimum value of the display parameter from the plurality of those display parameter values of the digital record which are associated with the image-displaying electronic device in the display database, depending on said visual acuity measurement associated with this user in the user database; and d) automatically applying the optimum value of this image display parameter to the image-displaying electronic device so as to improve the recognition and/or the readability of the displayed image and the visual comfort of the user.

The invention thus allows the parameters of an image-displaying electronic device to be automatically adapted depending on the visual and oculomotor profile of the user. The invention allows the optimum set of parameters associated with an image-displaying electronic device and a user to be recorded.

The application of the set of parameters enables more rapid reading and/or image recognition and ensures the visual comfort of the user.

According to one particular embodiment, the method for personalizing an image-displaying electronic device furthermore comprises the following steps:

a1) determining a visual configuration of the user for viewing images by means of the image-displaying electronic device;

b1) recording in the digital record of the user database at least one value of a parameter associated with a visual configuration of the user, said configuration being determined in step a1); and c1) selecting the optimum value of the display parameter from the plurality of display parameter values associated with the image-displaying electronic device depending on the digital record of the at least one value of a visual configuration parameter associated with this user in the user database, and on that at least one value of a parameter of evaluation of the visual and oculomotor profile which is associated with this user in the user database.

According to another particular aspect, the method for personalizing an image-displaying electronic device furthermore comprises the following steps:

a2) receiving a digitized image or a digitized text to be displayed on the image-displaying electronic device and extracting at least one property of the content of this digitized image or digitized text, respectively;

b2) recording in the digital record at least one value associated with a property of the content of this digitized image or digitized text, respectively; and c2) selecting the optimum value of the display parameter from the plurality of display parameter values associated with the image-displaying electronic device depending on the digital record of the at least one value associated with a property of the content of this digitized image or digitized text, respectively, and on that at least one value of a parameter of evaluation of the visual and oculomotor profile which is associated with this user.

Thus, the method of the invention allows the content of the displayed image to be personalized.

According to yet another particular aspect, the method for personalizing an image-displaying electronic device furthermore comprises the following steps:

a3) determining a visual activity of the user for viewing images by means of the image-displaying electronic device;

b3) recording in the digital record of the user database at least one value of a parameter associated with a visual activity of the user, said activity being determined in step a3); and c3) selecting the optimum value of the display parameter from the plurality of display parameter values associated with the displaying electronic device in the display database depending on the digital record of the at least one value of a parameter associated with a visual activity of this user in the user database, and on that at least one value of a parameter of evaluation of the visual and oculomotor profile which is associated with this user in the user database.

The following are other nonlimiting and advantageous features of the method for personalizing an image-displaying electronic device according to the invention:

the step a) of determining at least one value of a parameter of evaluation of the visual and oculomotor profile of this user comprises the following step a4):

a4) displaying sequentially, by means of the displaying electronic device, a test image following a plurality of image magnification values, and receiving a signal from the user so as to determine a minimum image magnification value for this user;

and the personalizing method furthermore comprises the following steps:

b4) recording, in the digital record of the user database and of the display database, the minimum magnification value associated with this image-displaying electronic device and with this user; and d4) configuring the image-displaying electronic device so as to use a magnification higher than or equal to the minimum image magnification value.

According to one particular and advantageous embodiment, the image-displaying electronic device comprises a sensor suitable for measuring an environmental parameter and the personalizing method comprises the following steps:

a5) of measuring by means of the sensor at least one value of the environmental parameter, which value is associated with the image-displaying electronic device and/or with the user;

b5) of recording in the digital record the measurement of the environmental parameter; and c5) of selecting the optimum value of the display parameter depending on the digital record of the measurement of the environmental parameter.

This processing of the displayed image is robust because it takes into account the visual and oculomotor profile of the user, the use environment of the appliance and the nature of the activity of the user.

According to another particular and advantageous embodiment, the image-displaying electronic device comprises speech synthesizing means and the activation of the speech synthesizing means is selected depending on the digital record comprising the plurality of those values of the display parameter which are associated with this image-displaying electronic device in the display database, and that at least one value of a parameter of evaluation of the visual and oculomotor profile which is associated with this user in the user database, and/or respectively depending on a value of a parameter associated with a visual configuration of the user in the user database, and/or depending on a value associated with a property of the content of this digitized image or digitized text, respectively, and/or depending on a value of a parameter associated with a visual activity of the user.

The following are other nonlimiting and advantageous features of the method for personalizing an image-displaying electronic device according to the invention:

in step c), each parameter used to determine the optimum value of the display parameter is attributed a preset weighting coefficient;

the image-displaying electronic device comprises a display screen and is preferably chosen from a television set, a computer, an Internet terminal, a smart phone, a tablet computer, an e-reader, a personal digital assistant (PDA), a digital magnifier, a video magnifier, an electronic magnifying glass and a video projector.

According to one particularly advantageous embodiment, the image-displaying electronic device comprises a piece of monocular or binocular informative eyewear configured to form at least one virtual image and the personalizing method furthermore comprises a step:

of adapting at least one value of a personalization parameter of the virtual image displayed by the piece of informative eyewear depending on the ophthalmic spectacles worn by this user, depending on the properties associated with the real background image seen by the user through the piece of informative eyewear, depending on the content of the virtual image displayed and/or depending on the ambient lighting, so as to improve the perception of the content of this virtual image by the user.

According to one particular aspect of this embodiment, the image-displaying electronic device comprises a piece of binocular informative eyewear configured to form a right virtual image in the direction of the right eye of the user and a left virtual image in the direction of the left eye of the user and the personalizing method furthermore comprises a step:

of adapting at least one value of a personalization parameter of the right virtual image and/or left virtual image displayed by the piece of binocular informative eyewear depending on the content of the displayed right virtual image and on the content of the displayed left virtual image so as to allow the right and left virtual images perceived by the right eye and left eye of the user, respectively, to fuse.

Advantageously, the at least one display parameter of variable value comprises an image magnification parameter, an image position parameter, a contrast parameter, a brightness parameter, a graphical resolution parameter, a grey level parameter or a color parameter.

The invention also proposes a method for personalizing a plurality of image-displaying electronic devices for a user, each image-displaying electronic device having at least one display parameter of variable value, the method comprising the following steps:

a6) determining and recording in the user database at least one value of a parameter of evaluation of the visual and oculomotor profile of this user;

b6) identifying an image-displaying electronic device used by this user;

c6) creating, in the user database, a digital record comprising at least one value of a parameter of evaluation of the visual and oculomotor profile of this user and recording, in the display database, a plurality of values of the display parameter which are associated with the image-displaying electronic device identified in the preceding step; and d6) selecting, with regard to viewing by the user of an image displayed by the identified image-displaying electronic device, an optimum value of the display parameter from the plurality of display parameter values associated with the identified image-displaying electronic device of the digital record in the display database depending on the at least one value of a parameter of evaluation of the visual and oculomotor profile of this user, in the user database.

Preferably, the digital record of the display database and of the user database is recorded on information technology means for storing information, which means are located remotely from the plurality of image-displaying electronic devices, each image-displaying electronic device being connected by communicating means to the information technology means for storing information.

The invention also proposes an image-displaying electronic device having at least one display parameter of variable value, the device being suitable for displaying an image and for modifying the displayed image depending on the value of the display parameter, the device comprising information technology means for implementing a personalizing method according to anyone of the described embodiments.

Advantageously, the image-displaying electronic device comprises a piece of monocular or binocular informative eyewear comprising at least one display connected to an image source and configured to form at least one virtual image in front of the eye of a user wearing this piece of informative eyewear, said piece of informative eyewear being connected to a control interface and to a database in order to adapt at least one value of a personalization parameter of the displayed virtual image depending on the visual and oculomotor parameters of the user wearing this piece of informative eyewear, the configuration parameters of his ophthalmic spectacles, the properties associated with the real background image seen by the user through the piece of informative eyewear and/or depending on the content of the displayed virtual image and/or depending on the ambient lighting, so as to improve the perception of the content of this virtual image by the user.

Particularly advantageously, the piece of binocular informative eyewear comprises a right display configured to form a right virtual image in the direction of the right eye of the user and a left display configured to form a left virtual image in the direction of the left eye of the user, said piece of informative eyewear being connected to a control interface and to a database in order to adapt at least one value of a personalization parameter of the displayed right virtual image and/or left virtual image depending on the content of the displayed right virtual image and on the content of the displayed left virtual image so as to allow the right and left virtual images perceived by the right eye and left eye of the user, respectively, to fuse.

DETAILED DESCRIPTION OF ONE EXAMPLE EMBODIMENT

The description which follows with reference to the appended drawings, which are given by way of nonlimiting examples, will make it easy to understand what the invention consists of and how it can be achieved.

Image-Displaying Electronic Devices

Figure 1:
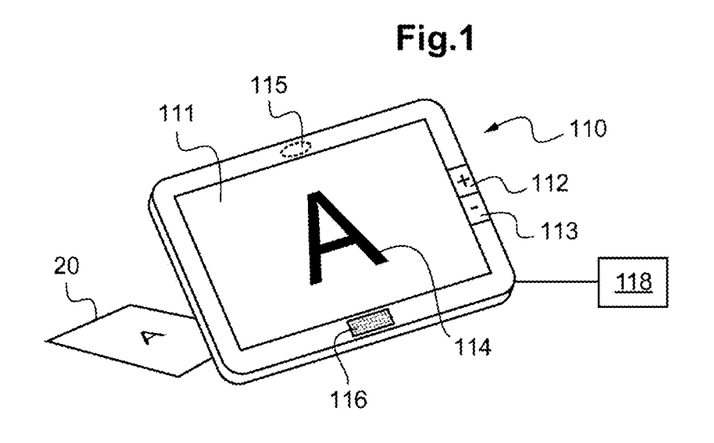
FIG. 1 shows a view of a display screen of an image-displaying electronic device of the electronic magnifying glass type.

FIG. 1 schematically shows an image-displaying electronic device of the electronic magnifying glass type 110 according to one embodiment of the invention. The electronic magnifying glass 110 comprises an integrated video camera 115 that allows a digitized image of a real document to be formed, a display screen 111 and buttons 112, 113 allowing the value of certain display parameters to be modified. Advantageously, the electronic magnifying glass 110 comprises a microphone 116 that allows the parameters of this electronic magnifying glass to be configured via vocal commands. If needs be, the electronic magnifying glass comprises a control interface 118 allowing its parameters to be configured for a user.

In a configuration menu, the user may select a parameter the value of which he would like to adjust. By way of example, the user would like to read a page of a paper 20. In order to adjust the magnification of the displayed image 114, the user selects the magnification adjustment parameter, for example via the control interface 118 or with a vocal command via the microphone 116. Two buttons are arranged on one edge of the screen, one button 112 being marked + and the other button 113 being marked −. By pressing on the button 112 marked with a + sign, the user has the option of increasing the magnification of the image 114 up to a maximum magnification value. By pressing on the button 113 marked with a − sign, the user has the option of decreasing the magnification of the image 114 down to a minimum magnification value. Alternatively to the adjusting buttons, the user may configure the value of the magnification entirely with vocal commands. The user may thus adjust the magnification to an optimum value for reading a page of a paper on the screen with an optimal visual comfort depending on his visual acuity. The optimum value is comprised in the range of magnification values available for this electronic magnifying glass. To read another medium, such as a book having printed characters of a different size to that of the page of a paper, another magnification value may be preferable for the same user and the same electronic magnifying glass. Analogously, the user may thus adjust the value of other configuration parameters, such as the contrast, displayed colors, screen brightness, etc. These various parameterization values associated with various visual activities are recorded in a database located in a memory of the electronic magnifying glass or on a remote server. The database also records parameters relating to the visual and oculomotor profile of the user 30. Each set of parameters is associated with a command that may be selected via one of the user interfaces, for example a vocal command such as "read the paper", "read a book", "image" etc. On subsequent use, the set of parameters associated with an identified user activity is thus easily recalled and applied.

Figure 2:
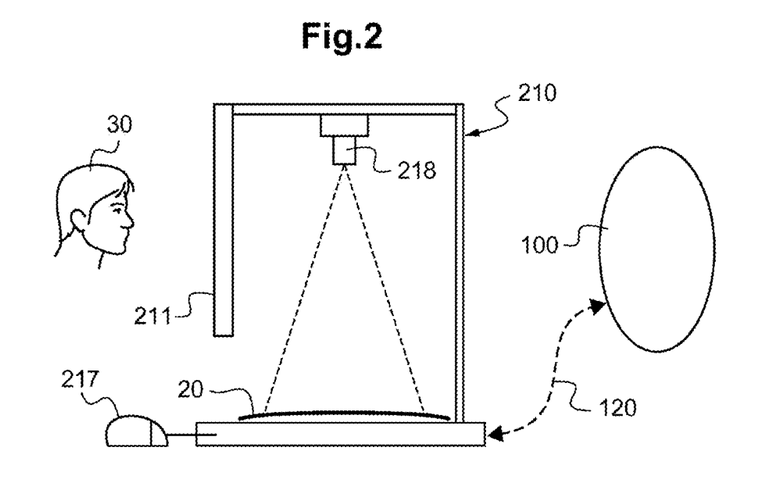
FIG. 2 shows a side view of a video-magnifier system.

FIG. 2 schematically shows another image-displaying electronic device consisting of an image magnifier 210. The image magnifier 210 comprises a video camera 218, a display screen 211 and a control interface, for example a computer mouse 217. The image magnifier 210 is connected to a system and user database 100 via a wireless or wired telecommunications link 120. A document 20 that the user 30 would like to view or read is placed facing the video camera 218. The video camera 218 forms a digitized image of the document 20. The image magnifier system 210 displays on the screen 211 at least one enlarged portion of the image digitized by the video camera 218. The user 30 may modify the configuration of the image magnifier system 210 using a user interface, such as for example a mouse 217 or a vocal control system. The device 210 may be configured to allow a text to be digitized for example using an optical character recognition (OCR) system. Advantageously, the image magnifier system 210 comprises a speech synthesizing means that allows out-loud reading of a digitized text to be synthesized. The system and user database 100 allows parameters relating to the visual and oculomotor profile of the user 30 and relating to one or more configurations of the image magnifier 210 to be recorded. For example, the database 100 allows a first configuration for reading a digitized text on the screen, comprising a magnification, a contrast and set background and text colors, to be stored. For example, the database allows another configuration to be stored in which, if the contrast, magnification or other parameters are incompatible with the visual or oculomotor performances of the user, the activation of the synthesized readout of a digitized text is triggered automatically.

Advantageously, in the case where the remote user database 100 already contains the personal values of the visual and oculomotor profile of the user when the video magnifier is turned on, the device automatically calculates the optimal values of the parameters of the image magnifier device. This remote storage of data on a server makes it possible to avoid having to redo tests of the visual performances of the user during set up of each image-displaying electronic device.

Figure 3:
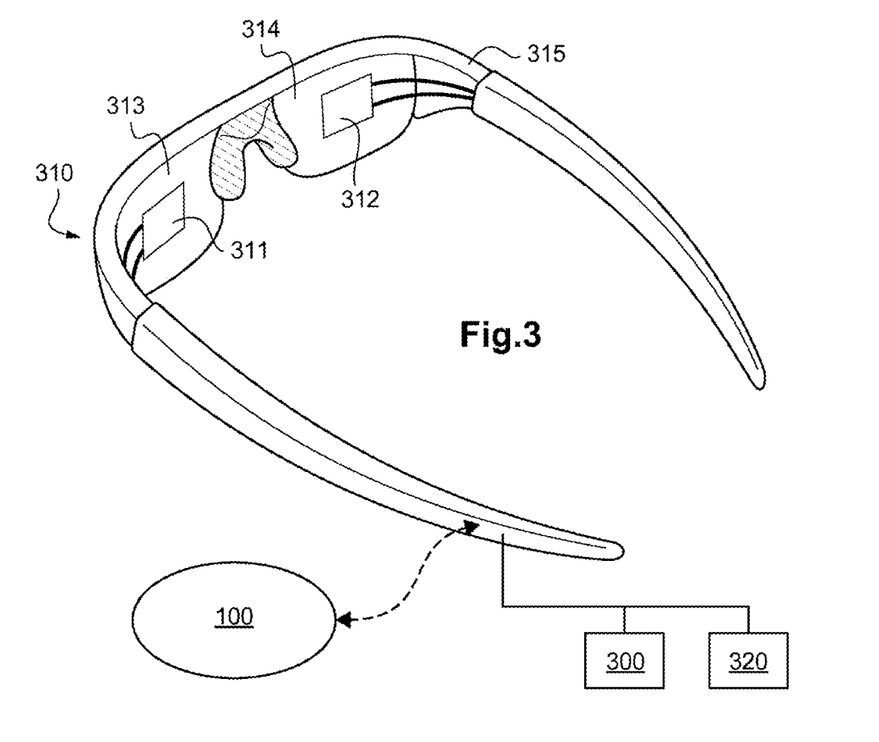
FIG. 3 schematically shows an example of a piece of informative eyewear.

FIG. 3 schematically shows another image-displaying electronic device i.e. a piece of informative eyewear 310. Pieces of informative eyewear comprising a display intended to be mounted on a spectacle frame in order to project a virtual image in the direction of one of the eyes of the spectacle wearer are known, as for example described in patent document EP1960821 or its equivalent US2009146916. Pieces of binocular informative eyewear comprising a left display 311 placed facing the left eye of the user and a right display 312 placed facing the right eye of the user are also known. These pieces of binocular informative eyewear allow stereoscopic images of a virtual or real content to be displayed in three dimensions. Pieces of informative eyewear for stereoscopic vision are for example described in patent document EP2070338 or its equivalent US2011102558.

The piece of informative eyewear 310 is connected to a source 300 of images that it is desired to display. The piece of informative eyewear generally comprises a control interface 320 in particular for adjusting the contrast and brightness of the displayed image or images. Displays 311, 312 designed for ophthalmic eyeglasses may be fastened to a spectacle frame comprising a left lens 313 and a right lens 314. The lenses 313, 314 may be lenses providing an ophthalmic compensation and/or photochromic eyeglasses. The piece of informative eyewear 310 allows a real or virtual stereoscopic image to be displayed by means of the displays 313, 314 in superposition with the background image formed by the lenses 313 and 314.

However, depending on the environment of the user, the conditions of vision of the image displayed by the piece of informative eyewear 310 may vary greatly. Here, the expression "environmental parameter" is understood to mean any parameter liable to modify the visual perception of a displayed image that depends neither on the user nor on the image-displaying device, such as for example ambient brightness which may vary from a very low brightness of the half-light type to a very high brightness for example such as found outside during the day. For example, in the case of a high ambient brightness, the contrast of the image displayed by the displays of the piece of informative eyewear may be considerably decreased, compared to the contrast of the same image in a dimly lit environment. Furthermore, in the case where the user is wearing photochromic eyeglasses, the contrast of a given image displayed via the display(s) 311, 312 varies depending on the ambient brightness, which modifies the transmission coefficient of the photochromic eyeglasses. These variations in the contrast of the image displayed by the displays 311, 312 may hinder the vision of the user or prevent the left and right images from fusing.

The piece of informative eyewear 310 is connected to a database 100 containing parameters relating to the visual and oculomotor profile of the user and configuration parameters of the piece of informative eyewear. Advantageously, the piece of informative eyewear also comprises an ambient brightness sensor. This sensor makes it possible to transmit a measurement of ambient brightness to the database. The information technology system of the piece of informative eyewear makes it possible to take into account the variations in ambient brightness measured by the sensor in order to adapt as best as possible the display parameters of the image, such as the contrast, colors and brightness of the image.

Figure 4:
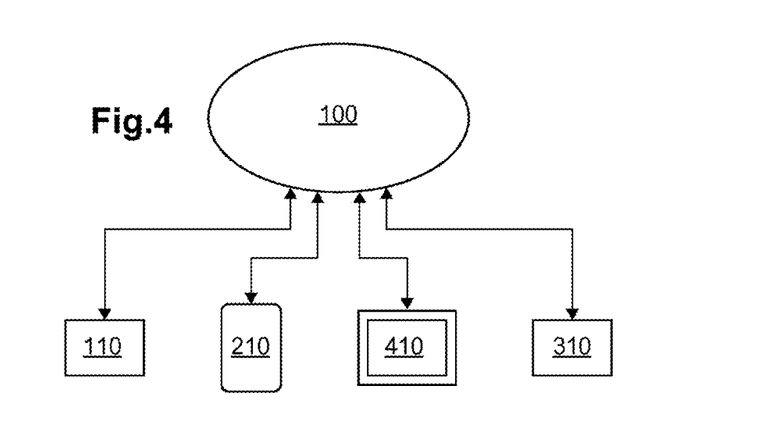
FIG. 4 schematically shows a system connecting a plurality of image-displaying electronic devices to a configuration database.

FIG. 4 schematically shows a plurality of image-displaying electronic devices such as for example an electronic magnifying glass 110, a video magnifier 210, a piece of informative eyewear 310 or even a tablet computer, a smart phone, a television screen 410 etc. The image-displaying electronic devices are all connected to the same database 100 containing parameters relating to the visual and oculomotor profile of a user 30 and configuration parameters of each of the image-displaying electronic devices. The system shown in FIG. 4 allows only parameters relating to the visual and oculomotor profile of an identified user to be stored. The values of the parameters of the visual and oculomotor profile of a user may be determined by a test method, as detailed below, implemented by one of the image-displaying electronic devices, the video magnifier 210 for example. The values of the parameters of the visual and oculomotor profile thus determined for a user are then stored in the database 100 and may be used to adapt the configuration of any other image-displaying electronic device used by this user and connected to the database 100. This system prevents the duplication of databases and allows the data relating to a specific user to be updated centrally.

Method for Personalizing Image-displaying Devices

One of the aims of the personalizing method of the invention is to automate the parameterization of an image-displaying electronic device depending on the needs of a user. The parameterization is thus carried out more rapidly than manually.

More precisely, one of the aims of the invention is to automatically adapt the values of the technical parameters of the display depending:

on the visual performances or capacities of the user, in order to promote and optimize his visual comfort;

on the conditions of use of the appliance, such as the distance, the ergonomics of the user and the ambient brightness; and/or on the type of medium and on the informative content that the user would like to view or read (different text size, different font, different contrast, etc.) according to his activity.

Various parameterization levels are possible. By way of simplification, here three parameterization levels of increasing precision are described.

At a first level, the parameterization results from a data treatment that is based entirely on the determination of the visual capacities of the subject and on the parameters of the image-displaying electronic device. This first-level treatment thus allows the parameterization of the device to be adapted depending on the visual capacities of a user.

At a second level, the parameterization results from a data treatment that is based not only on the determination of the visual capacities of the subject and on the parameters of the image-displaying electronic device, i.e. on the first-level treatment, but also on the use conditions and/or requirements relating to the activity of the subject. This second-level treatment allows the parameters of the display to be more precisely adapted to the environment or activity of a user.

At a third level, the parameterization results from a data treatment that takes into account the second-level treatment and that is adaptable automatically depending on variations in the use conditions or on an optimization of the visual performances desired by the subject, this optimization for example being related to a specific requirement of his activity. This third-level parameterization makes it possible to refine visual performance by adapting the parameterization values, preferably in real-time.

At each treatment level, the subject is offered the chance to validate the parameterization of the image-displaying electronic device so that he may either validate the choice of parameter value(s) or restart the treatment process. Restarting the treatment process may involve integrating a level n+1 in order to refine the image processing quality depending on other parameters.

First-level Parameterization

An example embodiment of a first-level parameterization will now be described in detail.

At the first level, the personalizing method is based on the implementation of a set of tests and measurements allowing:
the visual capacities of the user to be determined;
the technical parameters of the image-displaying device (or display): screen of a smart phone, tablet, computer, TV, video projector, etc., to be determined; and
all of the data relating to the user and to the device to be recorded and implemented in a database, preferably on a server.

Figure 5:
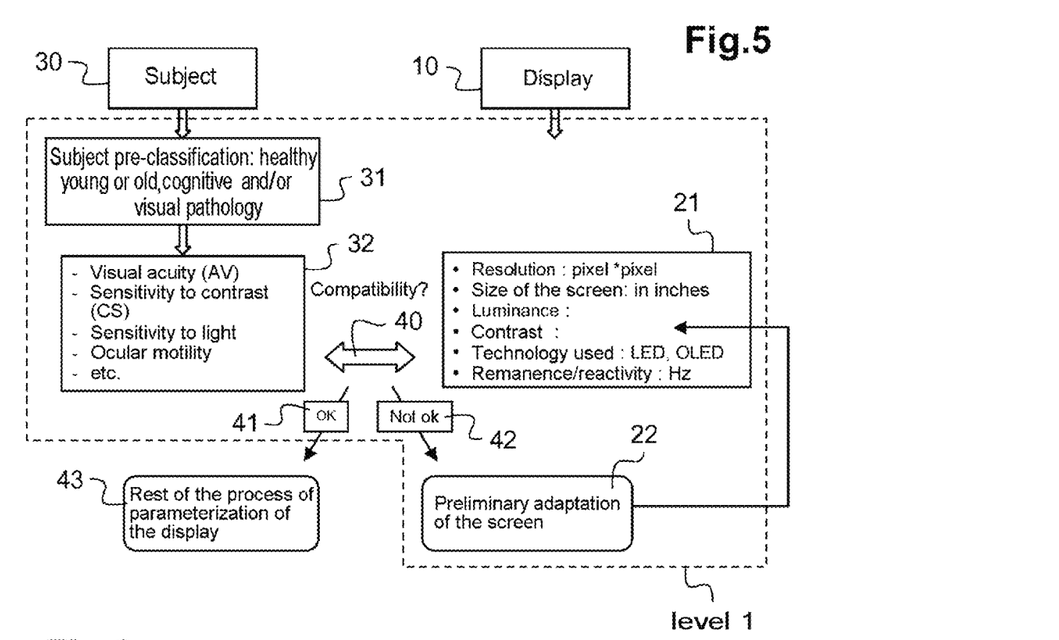
FIG. 5 shows an example of first-level parameterization of an image-displaying electronic device depending on the visual performances of a user and the technical parameters of the device.

FIG. 5 schematically shows an example of a first-level treatment. In this example, the objective of the personalizing method is to determine the technical parameters, the state and/or the initial performances of an image displayer 10 in order to determine an alert threshold for use of this image displayer. This step makes it possible not only to display an image that the user 30 would like to see but also to evaluate the performances of the user 30 during use of this image displayer.

Display Parameter(s) of the Image-displaying Electronic Device

Firstly, in step 21, all of the technical parameters that describe the image-displaying electronic device 10 are determined and in particular: its graphical resolution; its size (for example in number of pixels); its brightness; its contrast; the technology used (LED or OLED this having an impact on viewing angle); its color properties; and its remanence or reactivity, which impacts the refresh frequency of the displayed image.

Recording of the Set of Image Display Parameters

Preferably, the various parameters characterizing the image-displaying electronic device 10, and the range of values accessible for each of these parameters for a particular image-displaying electronic device and the current value of each parameter for this device 10 are recorded in a database 100.

In one embodiment, the parameterization database 100 is recorded in a memory of the image-displaying electronic device itself. This database is thus locally accessible. If needs be, another device 110, 210, 310, 410, etc. connected to this memory may also access this parameterization database 100.

Particularly advantageously, in another embodiment, all of the parameters of each of the image-displaying electronic devices 10, 110, 210, 310, 410 etc. used by a given user 30 are recorded in a database 100 on a remote server. The parameterization database 100 is for example recorded on a server or in the cloud. Preferably, the data recorded in the parameterization database are accessible in real time by any one of the image-displaying electronic devices 10, 110, 210, 310, 410 that a user 30 would like to use.

Evaluation of the Visual and Oculomotor Profile of a User

By "visual and oculomotor profile" of a user what is meant is all of the values of parameters defining the vision of a user.

The visual and oculomotor profile for example comprises, for each eye of the user, a measurement of near- or far-vision visual acuity or an ophthalmic lens prescription comprising measurements of sphere, cylinder and axis.

The user may have healthy or pathological vision. The user may have a visual deficiency. In the case of a visual pathology, the visual performances of a user may be very degraded in terms of visual acuity, sensitivity to contrast, and/or the spatial extent of his field of view. The need for vision enhancement is thus greater.

Example of the Determination of the Visual and Oculomotor Performances of a Subject Advantageously, as shown in FIG. 2, the visual and oculomotor profile of a subject 30 is evaluated by way of a series of interactive tests for evaluating the visual performances of the subject 30 and for evaluating subjective preferences of the subject 30.

Initially, in step 31, the general profile of the subject is entered into a database, according to a user classification depending on criteria such as:
does the subject wear glasses: Rx;
does the subject have a particular pathology (menu: ARMD, cataracts, retinitis pigmentosa, etc.);
the age of the subject: <45 years-45-70 years->70 years; and
preferred type of activity: reading, video, photos, etc.

Next, in step 32, the parameterization aims to determine the visual performances of the subject according to various criteria.

In the present document, the expression "visual activity of the user" is understood to mean the various types of activities associated with the use of an image-displaying device, such as the activities of reading, watching a video, looking at photos, films, consulting Internet pages, etc.

This step 32 may be carried out both with a text (recognition of letters or words) or with an image (recognition of shapes in an image). The parameters of the image processing or text processing vary depending on the medium displayed and depending on whether it is a question of a text or an image.

The aim of this step 32 is to determine the various visual performances required by the subject to perform a reading or image-recognition task, in particular: the visual acuity, the sensitivity to contrast, the sensitivity to light and/or the ocular motility of the user, as detailed below.

Following this step 32 an algorithm is selected so as to optimize the position, the size and the contrast of the text or displayed image.

In the example detailed below, the case where the parameterization is carried out for a display device used to display a text to be read is considered. Step 32 of determining the visual performances of the subject for example consists in a test or in a series of tests.

Example of a Series of Tests of the Visual and Oculomotor Performances of a Subject Letter Visual Acuity Test The objective of the visual acuity test is to determine the smallest character size identifiable by the subject for a given distance between the subject and the image-display electronic device. By way of example, this step is carried out by displaying in the real or virtual image letters the size of which varies according to a logarithmic progression. The subject indicates the smallest letter size read, for example by clicking on a line of letters. Preferably, the letters are chosen from the letters SLOAN and are displayed with a contrast of 100%.

The determination of the smallest letter size read by the user by means of the image-displaying device corresponds to a certain visual acuity, namely the displayed letter size that it is perceivable and identifiable. Letter size must be optimized (the smallest comfortable) to give the reader an optimal visual field or visual span. The larger the letter size, the smaller the number of letters visible in one go. A compromise between the size of the displayed letters and visual span makes it possible to determine optimal reading conditions for a user.

Contrast Test

The objective of the contrast test is to determine the capacity of the subject to distinguish the lowest perceptible contrast between a letter and the background of the displayed image. However, it is known that the contrast threshold depends on the size of the letter. The measurement of the contrast is therefore carried out using the optimal letter size determined in the preceding step, in order to obtain the most accurate measurement of contrast threshold.

For example, the contrast measurement is carried out by displaying letters of decreasing contrast. If the screen is small in size and all the letters do not fit therein, this step is carried out by scrolling the letters. The subject indicates, for example by a click, the lowest comfortably perceptible contrast. The value of this contrast threshold value (in %) is noted. The processing method is then adapted depending on the value of this threshold. For example, for a contrast threshold value lower than 5%, the image processing or text processing makes it possible to propose to readers a contrast inversion: for example the display of the text in white letters on a black background. For a contrast threshold value higher than or equal to 5%, the image processing or text processing may comprise an increase in the contrast of the text in order to enhance visual comfort.

Character Font Test (Subject Preferences)

The objective of the character font test is to select a character font to be displayed, for example on the display screen. Depending on the person, visual comfort will be higher if the text is displayed in characters of Times or Arial font for example, or in other fonts. Specifically, the visibility of the letter or the design of the letter impacts the reading performance of the subject. In the presence of certain pathologies, the subject may prefer straight and non-Gothic characters. For example, a subject suffering from age-related macular degeneration (ARMD) tends to exploit peripheral zones of the retina which have a lower resolution than the central zone of the retina. Thus, subjects affected by ARMD generally prefer straight printing characters that are simpler to identify with the peripheral zone of the retina.

For example, the selection of a character font comprises displaying, in four separate quadrants, letters of a size defined in step 1, with different fonts in the various quadrants (for example Arial, Times, Courier, etc.). The subject selects a preferred character font by clicking on the corresponding quadrant.

Character Spacing Test (Subject Preferences)

The objective of the character spacing test is to determine the optimal spacing between characters in order to facilitate recognition of a text. A subject with a retinal pathology will have difficulty in distinguishing letters that are closely spaced (crowding effect). This effect is accentuated when a subject affected by a retinal pathology such as ARMD reads using the peripheral zone of the retina.

The character spacing test for example comprises displaying words formed from letters having the size determined during the letter visual acuity test, with the character font and contrast selected beforehand and with a variable spacing, for example a single, double and triple spacing. The subject selects the letter arrangement that they like the most.

The text processing then applies the spacing between characters selected in this way in order to optimize the spatial arrangement of the characters of the displayed text.

Reading Acuity Test

The objective of the reading acuity test is to evaluate a reading parameter, such as the speed at which a text is read.

The recognition of isolated words or letters does not require the same visual performances as the reading of sentences. During continuous reading, it is important to have a good capacity for identification of letters (preceding steps maximizing letter visibility). During reading, the eyes perform rapid movements in order to explore the text. It is therefore also important to have a good oculomotor control in order to be able to continuously explore without fatigue all the elements of the text. Frequently a subject will experience fatigue while reading, because of difficulties he has moving his eyes effectively, these difficulties being associated with muscular effort or with a modification of oculomotor control in the presence of a retinal pathology. The objective of this test is thus to refine the letter size to be displayed via a sentence reading test, while retaining the letter parameters defined above.

The reading acuity test for example comprises displaying sentences of pre-calibrated length and measuring the reading speed of the subject. To start with the letter size is larger than the letter acuity in order to make it easy for the subject to read. The start and end time of the reading period is noted, for example via a click on the screen. A reading speed is calculated (number of words read per minute). The size of the letters of the sentences displayed is gradually decreased in logarithmic steps and the speed at which the sentence is read is evaluated for each size. Reading speed generally decreases when the size of the displayed letters becomes too small or difficult to read. The optimal letter size for reading is defined as being the letter size corresponding to the highest reading speed. It is also possible to define a threshold in % below which there is considered to be a drop in reading speed.

Display Mode Test (Subject Preferences)

The objective of the display mode test is to determine the optimal spatial arrangement of words, for example from among a column, line or word-by-word arrangement. Specifically, the display mode may affect the visual comfort and reading endurance of a subject. It is possible to facilitate reading by displaying the entire text in a single column, or on a single line in order to avoid the need to switch from one line to the next, or even word by word in the case of a severe visual deficiency.

The choice of the arrangement of the words makes it possible to decrease the noise of the document to be read. A displayed document containing a large amount of information may lead the subject to lose their bearings if too many elements are displayed at the same time. The choice of a particular arrangement makes it possible to increase the endurance and decrease the visual fatigue of the subject.

The determination of the display mode for example comprises displaying various display modes, column, line and isolated-word modes, respectively. The subject chooses the column, line or word display mode that best suits him, for example by clicking on the corresponding arrangement.

Alternatively, an algorithm may propose a display mode depending on the reading acuity determined beforehand. For example, if the patient requires a large letter size, it will be preferable to restructure the arrangement of the text so that it is displayed on one line or word by word. The optimal display mode may be determined depending on a preset visual acuity limit threshold for activation of this mode.

At the end of each test, the result of the test is preferably recorded in the user database.

Other complementary tests such as a speech synthesis activation test, a dazzle test, or a test of ocular motility may also be implemented using the image-displaying electronic device.

Comparison of the Visual Profile to the Parameters of the Display Device

In the embodiment illustrated in FIG. 5, after the steps 31 and 32 of determining the visual and oculomotor profile of the user and after the step 21 of determining the parameters of the image-displaying device, the information technology system makes it possible in step 40 to verify that it is possible to use the image displayer 10 to accurately determine the visual performances of the user 30 after the visual profile of the wearer has been set up.

The following table indicates relationships between the parameters of the image-displaying device and the visual functions of a user.

TABLE 1

Relationship between certain parameters of an image-displaying device and various visual functions

| Parameters of the image-displaying device | Related visual function |
| --- | --- |
| Resolution | Impact on the size of the letters visible by eye in a displayed text or on the smallest perceptible detail of a displayed image |
| Size | Impact on the visual span of the subject (size of the field visible in a single fixation). Parameter to be correlated with the size of the letters. The larger the size of the letters, the smaller the visual span. If the screen is small, visual span will be very small and visual performance very low. |
| Luminance | To be related to the sensitivity to light of the subject. |
| Contrast | To be related to the sensitivity to contrasts of the subject. A low subject sensitivity to contrasts implies an enhancement of the contrast of the image in order to obtain an optimal visual performance (less fatigue, better identification) |
| Technology: LED, OLED | Impact on the color of the image: depending on the viewing angle of the subject, the perception of the colored image is different. Also has an activity-dependent impact on image quality, especially in the case of perception of an image or a video. |
| Remanence/reactivity | Stabilization of the image if the image-displaying device is moving rapidly depending on the frequency of remanence of the appliance |

For example, an acuity measurement makes it possible to determine the smallest letter size that the user can view on the screen. If the screen is small in size and the resolution of the screen is low, it will not be possible to view letters that are smaller in size than a minimum size defined by the technical parameters of the screen corresponding to a certain visual acuity. It is enough then to define performance ranges depending on the profile of the user.

If the initial state of the image-displaying electronic device is not suitable for carrying out the measurements, step 22 may be carried out in two ways:
- the parameter(s) of the display device to be adjusted/modified to adapt it/them to the personalized profile of the wearer are determined; or
- the user is informed of the technological limits of the image displayer and a simplified module is put in place.

This example embodiment makes it possible to determine the way in which the image-displaying electronic device should be modified.

Validation and Use of the First-level Parameterization

In step 41, the recording of the parameters relating to the visual and oculomotor profile of the user and of those parameters relating to the image-displaying electronic device which are recommended for the envisioned device-based activity depending on the visual performances determined is validated.

It is then possible to terminate the parameterization or to continue the parameterization with, for example, a more precise higher-level parameterization.

A control system located on-board the device or remotely allows the parameterization of a device to be controlled in order to adapt as best as possible the content of the displayed image. Advantageously, a single remotely located control system allows the parameterization of a plurality of recorded image-displaying electronic devices to be controlled depending on the visual capacities of the user.

Even more advantageously, the remotely located control system makes it possible to control the parameterization of various image-displaying electronic devices, depending on the use conditions and activities of the user and on the physical parameters of each image-displaying electronic device.

Second-level Parameterization

Figure 6:
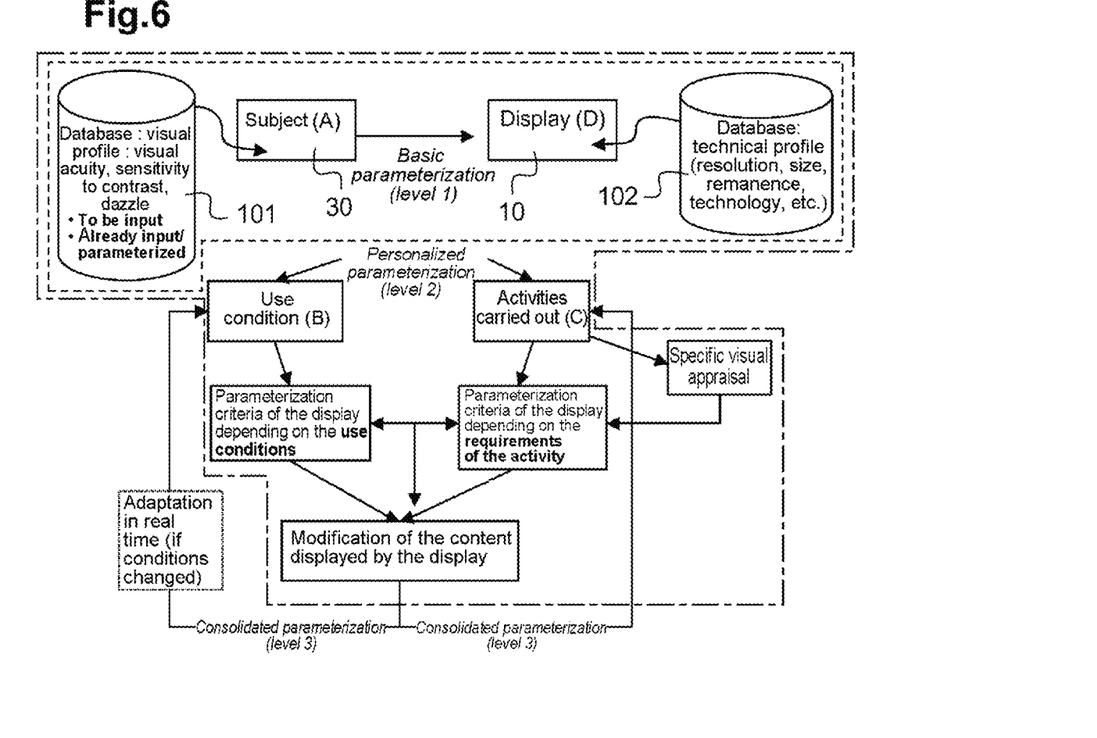
FIG. 6 shows a schematic of steps of a method for personalizing parameters of an image-displaying electronic device to various personalization levels.

FIG. 6 schematically shows an exemplary multi-level treatment.

The first level above parameterization makes it possible to determine, as detailed below, the visual and oculomotor performances of the subject, which are recorded in a user database 101, and the parameters of the image-displaying electronic device, which are recorded in a display database 102. The user database 101 and the display database 102 may be grouped in the same centralized database 100 on a server or be recorded and accessible independently of each other.

The second level makes it possible to take into account more precisely the visual and oculomotor profile of the user depending on the activities and/or environment of the user.

Specifically, it is known that visual performances may depend on the activity (reading, viewing of an image) and/or the environment (low or high ambient brightness for example).

The user may have healthy or pathological vision. More precisely, the user may have no permanent major visual defects but be subject to visual fatigue under certain conditions or for certain applications, for example near-vision reading only. In the case of a visual pathology, the use conditions (duration of use, type of activity, luminous environment) may degrade the visual performances.

At the second level, the personalizing method furthermore comprises the implementation of a set of tests and measurements allowing:
- the use conditions of the device by the user to be determined, such as:
  - the viewing distance;
  - the ambient brightness; and
  - whether the user is in a static position or moving;
- the activities desired by the user to be determined, such as:
  - the type of images to be identified (text/image, video, etc.); and
  - the performance requirements associated with the activity such as the required precision or endurance.

Step 1: Determination of the Use Conditions of the Image-Displaying Device by the Subject To do this, the following are preferably determined:
the position, posture and ergonomics of the subject.

Advantageously, the subject is equipped with a pair of spectacles equipped with ophthalmic lenses corresponding to a prescription Rx for sphere, cylinder and axis.

Particularly advantageously, the subject is also equipped with sensors suitable for determining the distance between the subject and a display screen (for example infrared sensors suitable for communicating between the appliance and the spectacles worn by the subject). Frequently the distances of use are different for a smart phone and a digital tablet. The determination of this viewing distance then makes it possible to adapt the size of the letters of a text or of a displayed image in order to maintain an optimal visual acuity for the user, whatever the reading or viewing distance.

Specifically, the size of the letters to display may also vary for example depending on whether the cephalic position determined corresponds to a standing, seated or lying-down reading position.

In one embodiment of a third-level treatment, the method furthermore comprises the following steps for determining:
- the position of the gaze relative to the image displayer so as to make the image processing dependent on the position of the gaze;
- whether the user is in a static position or moving, by means of an accelerometer;
- the environment in which the subject is located, via a measurement of ambient luminosity. Too high a light intensity may dazzle the user, whereas a low light intensity may lead to mesopic vision. The measurement of the light intensity may allow the luminance and contrast of the screen to be controlled depending on the sensitivity of the eye of the user and this ambient brightness. The saliency of the image may be optimized when the subject is in the dark;
- a brightness variation; and
- a static or dynamic (locomotion) use.

Step 2: Determination of the Activity of the Subject

Advantageously, the subject is asked to select for example from a list of drop-down menus one or more possible activities from various categories.

A first choice for example aims to determine, for a particular image-displaying device, a type of associated activity such as: reading (at length or for reference), writing (SMS, email), video games, watching films/TV, consulting Internet pages, etc. Specifically, it is known that visual performances are solicited differently depending on the type of activity. The parameterization of the image may thus take into account the envisioned activity.

Requirements are generally associated with each type of activity, such as concentration level: high, average or low, endurance depending on the length of the activity, or even performance in terms of reading speed or precision (for example for the reading of SMSs).

Third-level Parameterization

The third level makes it possible to take into account variations in the visual and oculomotor profile of the user and/or variations in the use conditions.

Certain parameters of the visual and oculomotor profile of the user may vary over time. Thus, a visual pathology may progress over time. Moreover, the user may be subject to a temporary visual fatigue depending on the duration of use.

Other parameters depend on the use conditions or activities of the user. Thus, in the case of a user with healthy vision, this user may have a reduced acuity in certain situations, for example of low brightness or conversely of high brightness.

In the case where a user is equipped with a piece of informative eyewear and is moving, the environment may vary and affect the viewing of a displayed image, for example depending on the light or dark color of the background on which the virtual image produced by the piece of informative eyewear is superposed.

In another exemplary third-level treatment, a technical parameter of the displayed image corresponds to the size of the characters of the text, which size may be modified depending on the reading distance of the user in order to be continuously adapted to his visual acuity.

Particularly advantageously, one embodiment of the proposed invention thus makes it possible to adapt in real-time the displayed image in order to provide the user with freedom and an optimal visual comfort whatever the image-displaying electronic device, the use conditions and the visual task.

Various modes of execution of step 32 are envisioned. The execution of step 32 may be entirely automatic, semiautomatic or by iterations on each test.

The method allows the parameterization of one or more image-displaying devices to be automatically adapted depending: on the visual capacities of the user; on configuration parameters of each image-displaying device; and possibly on conditions relating to the surroundings or to the informational content of the image or text that it is desired to view.

The invention claimed is:

1. A method for personalizing an image-displaying electronic device having at least one display parameter of variable value, the image-displaying electronic device being one of a plurality of image-displaying electronic devices, the image-displaying electronic device being suitable for displaying an image and for modifying the displayed image depending on the value of the display parameter, said personalizing method comprising adapting the value of the display parameter to a user by way of the following steps:
   a) connecting the image-displaying electronic device to a user database, determining and recording in the user database at least one value of a parameter of evaluation of the visual and oculomotor profile of the user, said at least one value comprising a measurement of the visual acuity of this user;
   b) connecting the image-displaying electronic device to a display database and creating, in the display database, a digital record comprising a plurality of display parameter values associated with the image-displaying electronic device and with an identifier of the image-displaying electronic device, the digital record being stored in a register of the display database comprising a plurality of digital records associated with the plurality of image-displaying electronic devices, each record of one of the plurality of image-displaying electronic devices of the register being associated with a single identifier;
   c) selecting, with regard to viewing by the user of an image displayed by the image-displaying electronic device, an optimum value of the display parameter from the plurality of those display parameter values of the digital record which are associated with the image-displaying electronic device in the display database, depending on said visual acuity measurement associated with this user in the user database; and
   d) automatically applying the optimum value of this image display parameter to the image-displaying electronic device so as to improve the recognition or the readability of the displayed image and the visual comfort of the user.

2. The method for personalizing an image-displaying electronic device as claimed in claim 1, furthermore comprising the following steps:

a1) determining a visual configuration of the user for viewing images by means of the image-displaying electronic device;

b1) recording in the digital record of the user database at least one value of a parameter associated with a visual configuration of the user, said configuration being determined in step a1); and c1) selecting the optimum value of the display parameter from the plurality of display parameter values associated with the image-displaying electronic device depending on the digital record of the at least one value of a visual configuration parameter associated with this user in the user database, and on that at least one value of a parameter of evaluation of the visual and oculomotor profile which is associated with this user in the user database.

3. The method for personalizing an image-displaying electronic device as claimed in claim 1, furthermore comprising the following steps:

a2) receiving a digitized image or a digitized text to be displayed on the image-displaying electronic device and extracting at least one property of the content of this digitized image or digitized text, respectively;

b2) recording in the digital record at least one value associated with a property of the content of this digitized image or digitized text, respectively; and c2) selecting the optimum value of the display parameter from the plurality of display parameter values associated with the image-displaying electronic device depending on the digital record of the at least one value associated with a property of the content of this digitized image or digitized text, respectively, and on that at least one value of a parameter of evaluation of the visual and oculomotor profile which is associated with this user.

4. The method for personalizing an image-displaying electronic device as claimed in claim 1, furthermore comprising the following steps:

a3) determining a visual activity of the user for viewing images by means of the image-displaying electronic device;

b3) recording in the digital record of the user database at least one value of a parameter associated with a visual activity of the user, said activity being determined in step a3); and c3) selecting the optimum value of the display parameter from the plurality of display parameter values associated with the displaying electronic device in the display database depending on the digital record of the at least one value of a parameter associated with a visual activity of this user in the user database, and on that at least one value of a parameter of evaluation of the visual and oculomotor profile which is associated with this user in the user database.

5. The method for personalizing an image-displaying electronic device as claimed in claim 1, in which the step a) of determining at least one value of a parameter of evaluation of the visual and oculomotor profile of this user comprises the following step a4):

a4) displaying sequentially, by means of the displaying electronic device, a test image following a plurality of image magnification values, and receiving a signal from the user so as to determine a minimum image magnification value for this user;

and the personalizing method furthermore comprising the following steps:

b4) recording, in the digital record of the user database and of the display database, the minimum magnification value associated with this image-displaying electronic device and with this user; and d4) configuring the image-displaying electronic device so as to use a magnification higher than or equal to the minimum image magnification value.

6. The method for personalizing an image-displaying electronic device as claimed in claim 1, in which the image-displaying electronic device comprises a sensor suitable for measuring an environmental parameter, the method comprising the steps:

a5) of measuring by means of the sensor at least one value of the environmental parameter, which value is associated with the image-displaying electronic device and/or with the user;

b5) of recording in the digital record the measurement of the environmental parameter; and c5) of selecting the optimum value of the display parameter depending on the digital record of the measurement of the environmental parameter.

7. The method for personalizing an image-displaying electronic device as claimed in claim 1, in which the image-displaying electronic device comprises a speech synthesizer and in which the activation of the speech synthesizer is selected depending on the digital record comprising the plurality of those values of the display parameter which are associated with this image-displaying electronic device in the display database, and that at least one value of a parameter of evaluation of the visual and oculomotor profile which is associated with this user in the user database, and/or respectively depending on a value of a parameter associated with a visual configuration of the user in the user database, and/or depending on a value associated with a property of the content of this digitized image or digitized text, respectively, and/or depending on a value of a parameter associated with a visual activity of the user.

8. The method for personalizing an image-displaying electronic device as claimed in claim 1, in which during step c), each parameter used to determine the optimum value of the display parameter is attributed a preset weighting coefficient.

9. The method for personalizing an image-displaying electronic device as claimed in claim 1, in which the image-displaying electronic device comprises a display screen and is preferably chosen from a television set, a computer, an Internet terminal, a smart phone, a tablet computer, an e-reader, a personal digital assistant (PDA), a digital magnifier, a video magnifier, an electronic magnifying glass and a video projector.

10. The method for personalizing an image-displaying electronic device as claimed in claim 1, in which the image-displaying electronic device comprises a piece of monocular or binocular informative eyewear configured to form at least one virtual image, and in that the personalizing method furthermore comprises a step:

of adapting at least one value of a personalization parameter of the virtual image displayed by the piece of informative eyewear depending on the ophthalmic spectacles worn by this user, depending on the properties associated with the real background image seen by the user through the piece of informative eyewear, depending on the content of the virtual image displayed and/or depending on the ambient lighting, so as to improve the perception of the content of this virtual image by the user.

11. The method for personalizing an image-displaying electronic device as claimed in claim 10, in which the image-displaying electronic device comprises a piece of binocular informative eyewear configured to form a right virtual image in the direction of the right eye of the user and a left virtual image in the direction of the left eye of the user and in that the personalizing method furthermore comprises a step:

of adapting at least one value of a personalization parameter of the right virtual image and/or left virtual image displayed by the piece of binocular informative eyewear depending on the content of the displayed right virtual image and on the content of the displayed left virtual image so as to allow the right and left virtual images perceived by the right eye and left eye of the user, respectively, to fuse.

12. The method for personalizing an image-displaying electronic device as claimed in claim 10, in which the at least one display parameter of variable value comprises an image magnification parameter, an image position parameter, a contrast parameter, a brightness parameter, a graphical resolution parameter, a grey level parameter or a color parameter.

13. The method for personalizing an image-displaying electronic device as claimed in claim 1, in which the image-displaying electronic device comprises a piece of binocular informative eyewear configured to form a right virtual image in the direction of the right eye of the user and a left virtual image in the direction of the left eye of the user and in that the personalizing method furthermore comprises a step:

of adapting at least one value of a personalization parameter of the right virtual image and the left virtual image displayed by the piece of binocular informative eyewear depending on the content of the displayed right virtual image and on the content of the displayed left virtual image so as to allow the right and left virtual images perceived by the right eye and left eye of the user, respectively, to fuse.

14. The method for personalizing an image-displaying electronic device as claimed in claim 1, in which the at least one display parameter of variable value comprises an image magnification parameter, an image position parameter, a contrast parameter, a brightness parameter, a graphical resolution parameter, a grey level parameter or a color parameter.

15. An image-displaying electronic device having at least one display parameter of variable value, the device being suitable for displaying an image and for modifying the displayed image depending on the value of the display parameter, the device comprising a memory for implementing a personalizing method as claimed in claim 1.

16. The image-displaying electronic device as claimed in claim 15, comprising a piece of monocular or binocular informative eyewear comprising at least one display connected to an image source and configured to form at least one virtual image in front of the eye of a user wearing this piece of informative eyewear, said piece of informative eyewear being connected to a control interface and to a database in order to adapt at least one value of a personalization parameter of the displayed virtual image depending on the visual and oculomotor parameters of the user wearing this piece of informative eyewear, the configuration parameters of his ophthalmic spectacles, the properties associated with the real background image seen by the user through the piece of informative eyewear and/or depending on the content of the displayed virtual image and/or depending on the ambient lighting, so as to improve the perception of the content of this virtual image by the user.

17. The image-displaying electronic device as claimed in claim 16, comprising a piece of binocular informative eyewear comprising a right display configured to form a right virtual image in the direction of the right eye of the user and a left display configured to form a left virtual image in the direction of the left eye of the user, said piece of informative eyewear being connected to a control interface and to a database in order to adapt at least one value of a personalization parameter of the displayed right virtual image and/or left virtual image depending on the content of the displayed right virtual image and on the content of the displayed left virtual image so as to allow the right and left virtual images perceived by the right eye and left eye of the user, respectively, to fuse.

\* \* \* \* \*